(12) United States Patent
Lee et al.

(10) Patent No.: US 10,757,740 B2
(45) Date of Patent: Aug. 25, 2020

(54) METHOD FOR TRANSMITTING OR RECEIVING SIGNALS IN WIRELESS COMMUNICATION SYSTEM AND APPARATUS THEREFOR

(71) Applicant: LG Electronics Inc., Seoul (KR)

(72) Inventors: Sangrim Lee, Seoul (KR); Hojae Lee, Seoul (KR); Dongkyu Kim, Seoul (KR); Myeongjin Kim, Seoul (KR); Kwangseok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/342,793

(22) PCT Filed: Aug. 8, 2017

(86) PCT No.: PCT/KR2017/008540
§ 371 (c)(1),
(2) Date: Apr. 17, 2019

(87) PCT Pub. No.: WO2018/074719
PCT Pub. Date: Apr. 26, 2018

(65) Prior Publication Data
US 2020/0053789 A1 Feb. 13, 2020

Related U.S. Application Data

(60) Provisional application No. 62/409,841, filed on Oct. 18, 2016.

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01)

(58) Field of Classification Search
CPC ............ H04W 74/0833; H04W 74/004
See application file for complete search history.

(56) References Cited

U.S. PATENT DOCUMENTS

| 2012/0213196 A1* | 8/2012 | Chung | H04B 1/713 370/330 |
| 2012/0287847 A1* | 11/2012 | Plestid | H04L 51/08 370/315 |

(Continued)

FOREIGN PATENT DOCUMENTS

| KR | 1020110057069 | 5/2011 |
| WO | WO2016013744 | 1/2016 |

OTHER PUBLICATIONS

CATT, "Discussion on randomization on DMRS," R1-1608715, 3GPP TSG RAN WGI Meeting #86bis, Lisbon, Portugal, Oct. 10-14, 2016, 5 pages.

(Continued)

*Primary Examiner* — Duc C Ho
(74) *Attorney, Agent, or Firm* — Fish & Richardson P.C.

(57) ABSTRACT

A method for performing, by a terminal, a contention-based uplink transmission in a wireless communication system, according to one embodiment of the present invention, comprises the steps of: selecting any one of a plurality of codewords and any one of a plurality of demodulation reference signals (DMRS), the plurality of codewords and the plurality of DMRSs being set in a contention resource area for a contention-based uplink transmission; and transmitting, through the contention resource area, uplink data that corresponds to the selected codeword, and the selected DMRS, wherein the DMRS is transmitted in an orthogonal multiple access (OMA) scheme, the uplink data is transmitted in a non-orthogonal multiple access (NOMA) scheme, and the selected DMRS is one of the K DMRSs mapped to the selected codeword, wherein K may be an integer greater (Continued)

than or equal to 1, which is changed according to a DMRS collision occurring in the contention resource area.

15 Claims, 12 Drawing Sheets

(56) References Cited

U.S. PATENT DOCUMENTS

2016/0255654 A1  9/2016 Lin et al.
2017/0041906 A1* 2/2017 Tsai .................. H04L 5/0037

OTHER PUBLICATIONS

ETRI, "DMRS design for non-orthogonal UL multiple access user channel estimation," R1-1609548, 3GPP TSG-RAN1#86bis, Lisbon, Portugal, Oct. 10-14, 2016, 6 pages.
PCT International Search Report and Written Opinion in international Application No. PCT/KR2017/008540, dated Nov. 17, 2017, 16 pages (with English translation).

* cited by examiner

METHOD FOR TRANSMITTING OR RECEIVING SIGNALS IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2017/008540, filed on Aug. 8, 2017, which claims the benefit of U.S. Provisional Application No. 62/409,841, filed on Oct. 18, 2016. The disclosures of the prior applications are incorporated by reference in their entirety.

TECHNICAL FIELD

The present invention relates to a wireless communication system and, more particularly, to a method of performing contention-based uplink transmission and reception and an apparatus therefor.

BACKGROUND ART

As more communication devices have required higher communication capacity, scenarios of a next-generation communication system (e.g., a fifth generation (5G) or New radio access technology (RAT) system) have been discussed recently. The scenarios under discussion include enhanced mobile broadband (eMBB), ultra-reliable machine-type communications (uMTC), and massive machine-type communications (mMTC). eMBB is a next-generation mobile communication scenario having characteristics of high spectrum efficiency, high user experienced data rate, and high peak data rate. uMTC is a next-generation mobile communication scenario having characteristics of ultra-reliability, ultra-low latency, and ultra-high availability and includes, for example, vehicle-to-everything (V2X) services, emergency services, and remote control services. mMTC is a next-generation mobile communication scenario having characteristics of low cost, low energy, short packet, and massive connectivity and may include, for example, Internet of things (IoT).

FIG. 1 illustrates key 5G performance requirements for IMT 2020 and an association between each service scenario and the 5G performance requirements. Particularly, a uMTC service has a very limited over-the-air (OTA) latency requirement and requires high mobility and high reliability (OTA latency<1 ms, mobility>500 km/h, and block error rate (BLER)<$10^{-6}$).

As described above, New RAT considering eMBB, mMTC, and ultra-reliable low-latency communication (URLLC) has been discussed for next-generation wireless communication.

DETAILED DESCRIPTION OF THE INVENTION

Technical Problems

An object of the present invention is to provide a method of more efficiently and accurately performing contention-based uplink transmission and reception and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

According to an aspect of the present invention, provided herein is a method of performing contention-based uplink (UL) transmission by a user equipment (UE) in a wireless communication system, including selecting any one of a plurality of codewords and any one of a plurality of demodulation reference signals (DMRSs), configured in a contention resource region for contention-based UL transmission; and transmitting the selected DMRS and UL data corresponding to the selected codeword through the contention resource region, wherein the DMRS is transmitted by an orthogonal multiple access (OMA) scheme and the UL data is transmitted by a non-orthogonal multiple access (NOMA) scheme, and the selected DMRS is one of 'K' DMRSs mapped to the selected codeword, 'K' being an integer equal to or greater than 1, which is changed according to a DMRS collision occurring in the contention resource region.

In another aspect of the present invention, provided herein is a user equipment (UE) for performing contention-based uplink (UL) transmission in a wireless communication system, including a processor configured to select any one of a plurality of codewords and any one of a plurality of demodulation reference signals (DMRSs), configured in a contention resource region for contention-based UL transmission; and a transmitter configured to transmit the selected DMRS and UL data corresponding to the selected codeword through the contention resource region, according to control of the processor, wherein the DMRS is transmitted by an orthogonal multiple access (OMA) scheme and the UL data is transmitted by a non-orthogonal multiple access (NOMA) scheme, and the selected DMRS is one of 'K' DMRSs mapped to the selected codeword, 'K' being an integer equal to or greater than 1, which is changed according to a DMRS collision occurring in the contention resource region.

In another aspect of the present invention, provided herein is a method of receiving a contention-based uplink (UL) transmission signal by a base station (BS) in a wireless communication system, including detecting a demodulation reference signal (DMRS) of a user equipment (UE) among a plurality of DMRSs through blind detection in a contention resource region for contention-based UL transmission; detecting a codeword of the UE among a plurality of codewords in the contention resource region using the detected DMRS; and decoding UL data corresponding to the decoded codeword, wherein the DMRS is received by an orthogonal multiple access (OMA) scheme and the UL data is received by a non-orthogonal multiple access (NOMA) scheme, the detected DMRS is one of 'K' DMRSs mapped to the detected codeword, 'K' being an integer equal to or greater than 1, which is changed according to a DMRS collision occurring in the contention resource region.

In another aspect of the present invention, provided herein is a base station (BS) for performing the above-described method.

The DMRS collision may indicate transmission of the same DMRS on the same time-frequency resource by different UEs and, as the number of DMRS collisions per unit time increases, 'K' may also increase.

The number of the codewords in the contention resource region may be set to be smaller than the number of the DMRSs.

The UE may receive information indicating that one codeword is mapped to the 'K' DMRSs.

'K' may be determined by a first equation 'floor (N_DMRS/N_CODE)', 'N_DMRS' may be the number of the DMRSs, 'N_CODE' may be the number of the codewords, and 'floor' may be a floor function outputting a maximum integer not exceeding an input value.

Mapping between the codewords and the DMRSs may be determined by a second equation '$\alpha=MOD(\beta, K)$', '$\alpha$' may be a codeword index, '$\beta$' may be a DMRS index, and 'MOD' may be a modulo operation.

The NOMA scheme may be sparse code multiple access (SCMA) and the codewords may be SCMA codewords.

Advantageous Effects

According to an embodiment of the present invention, a user equipment can increase multiplexing capacity during contention-based uplink transmission because uplink data is transmitted by a NOMA and can improve contention-based UL transmission and reception performance by adaptively changing a mapping scheme between codewords for UL data and DMRSs according to collision between DMRSs transmitted by an OMA scheme.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
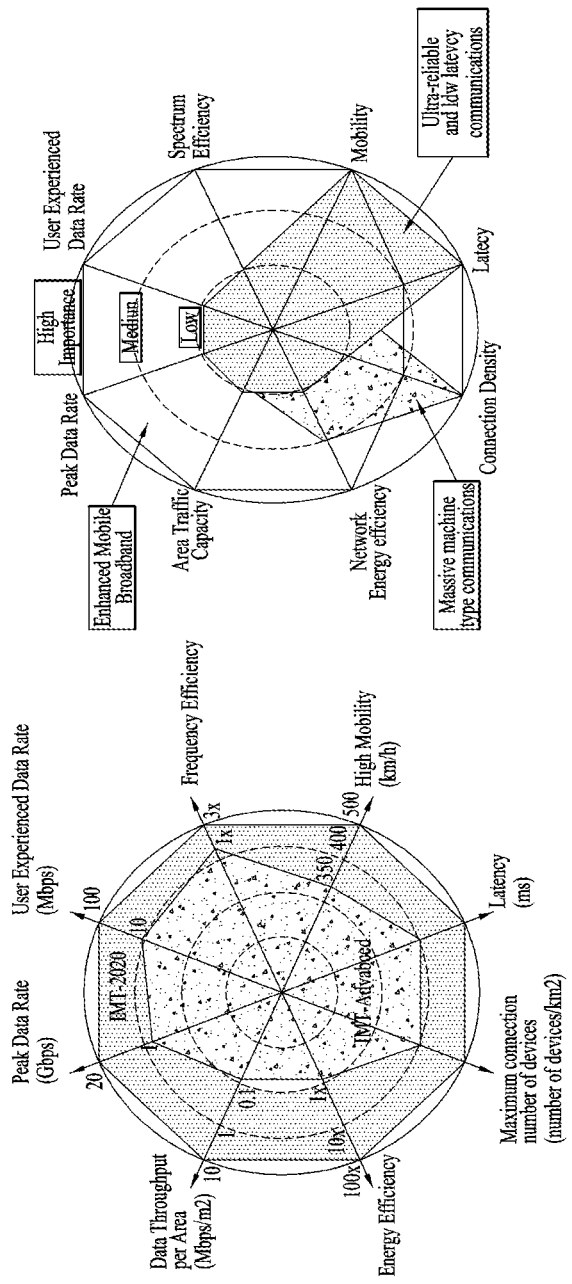
FIG. 1 illustrates 5G service scenarios and performance requirements.
Figure 2:
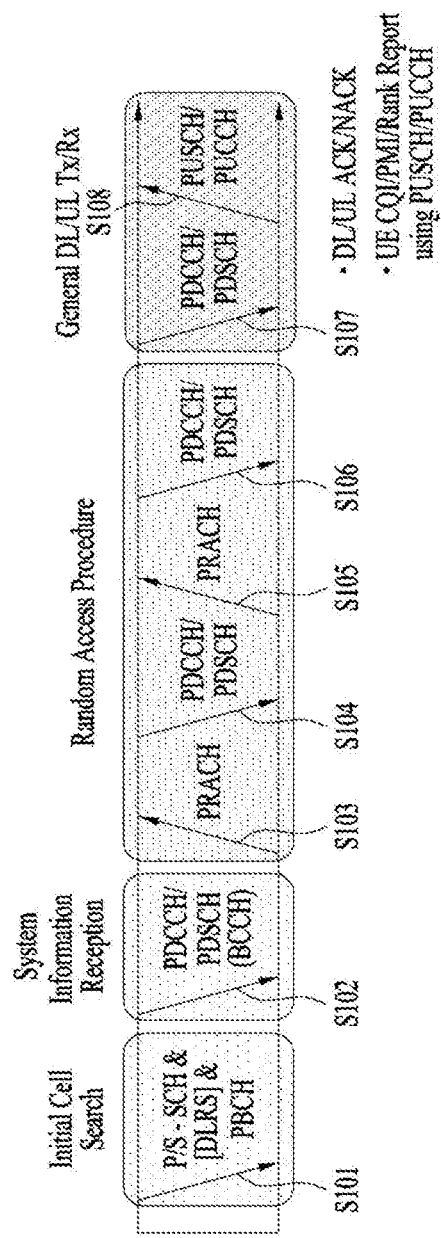
FIG. 2 illustrates physical channels used in a 3GPP LTE/LTE-A system and a general signal transmission method using the same.

FIG. 2 is a diagram for explaining an example of physical channels used for 3GPP LTE/LTE-A system and a general signal transmission method using the same.

Referring to FIG. 2, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 3:
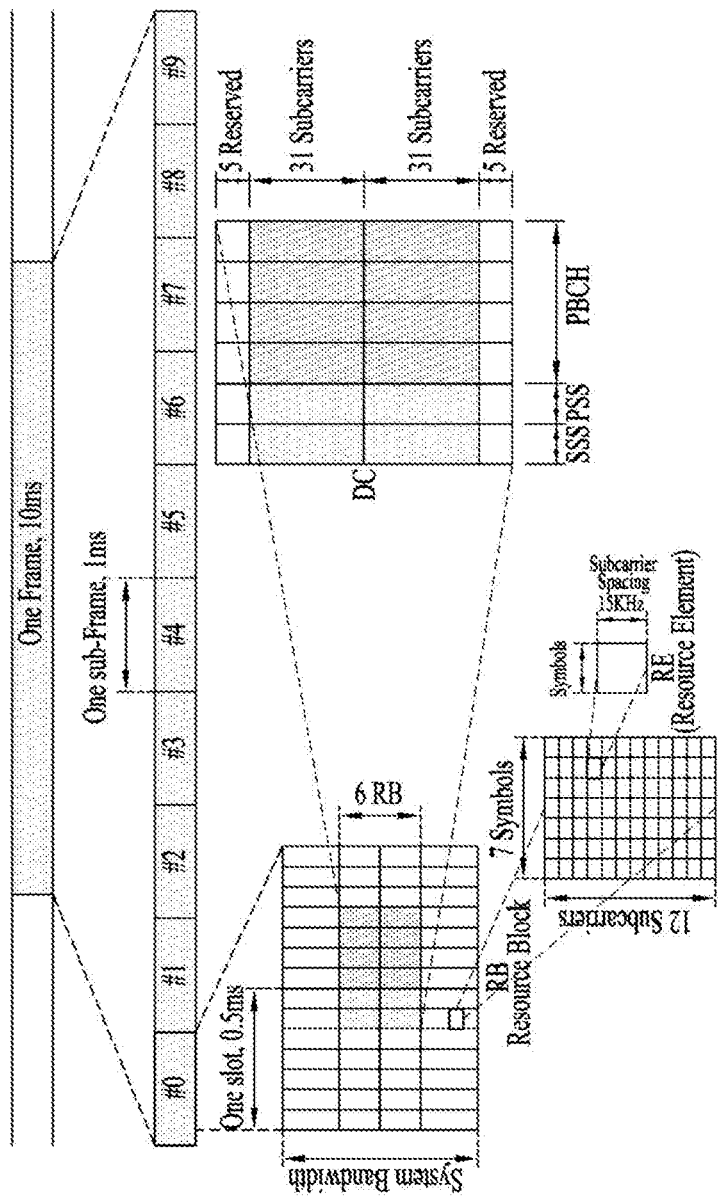
FIG. 3 illustrates the structure of a radio frame of a 3GPP LTE/LTE-A system.

FIG. 3 is a diagram for explaining an example of a structure of a radio frame. Referring to FIG. 3, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

A frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference. When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel). That is, when normal CP is used, 1 RB is defined as 12 subcarriers with 15 kHz subcarrier spacing and 7 OFDM symbols.

6 RBs in a center frequency carry a primary synchronization signal (PSS) and a secondary synchronization signal (SSS), for synchronization, and a physical broadcast channel (PBCH) for system information transmission. The above-described structure of the frame and the above-described positions of signals and channels may vary with a normal/extended CP and TDD/FDD.

Figure 4:
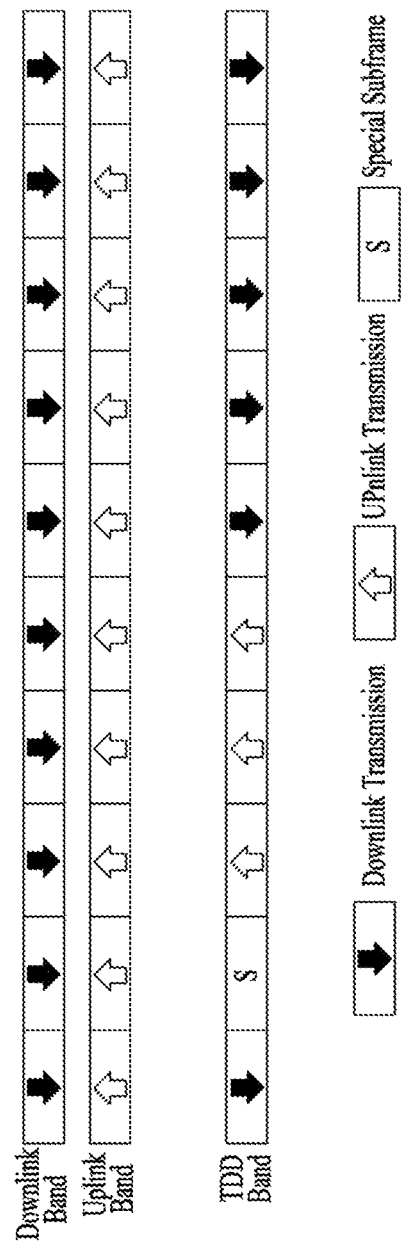
FIG. 4 illustrates FDD and TDD schemes in a 3GPP LTE/LTE-A system.

FIG. 4 illustrates FDD and TDD in an LTE/LTE-A system. Referring to FIG. 4, in FDD, DL and UL frequency bands are distinguished. In TDD, a DL region and a UL region are distinguished in units of subframes in the same band.

New RAT

A subframe needs to be newly designed to satisfy a low-latency requirement among New RAT performance requirements.

[Self-Contained Subframe]

Figure 5:
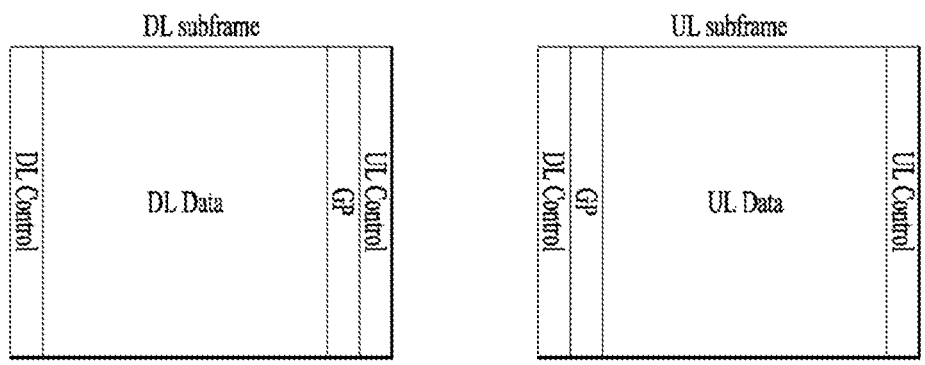
FIG. 5 illustrates the structure of a self-contained subframe according to an embodiment of the present invention.

FIG. 5 illustrates a self-contained subframe newly proposed for New RAT. Hereinafter, the self-contained subframe may be simply referred to as a subframe.

According to a TDD-based self-contained subframe structure, a resource region for DL and a resource region for UL (e.g., a DL control channel and a UL control channel) are present in one subframe.

In the self-contained subframe illustrated in FIG. 5, the subframe is configured in order of a DL control region, a data region, and a UL control region but the present invention is not limited thereto. For example, the subframe may be configured in order of a DL control region, a UL control region, and a data region as another structure of the self-contained subframe.

The self-contained subframe may be divided into a DL self-contained subframe and a UL self-contained subframe according to a data direction transmitted in the corresponding subframe.

In this structure of the self-contained subframe, a time gap is needed for the process of switching from a transmission mode to a reception mode or from the reception mode to the transmission mode of an eNB and a UE. To this end, at least one OFDM symbol corresponding to a switching time from DL to UL in the structure of the self-contained subframe is configured as a guard period (GP). The GP is positioned at a switching timing from DL to UL. For example, the GP is positioned between a DL data region and a UL control region in a DL subframe and is positioned between a DL control region and a UL data region in a UL subframe.

Meanwhile, one subframe may be defined as a predetermined time length. For example, in New RAT (NR), the time duration of one subframe may be fixed to 1 ms. In this case, since one symbol length is determined according to a subcarrier spacing, the number of symbols included in one subframe may be determined according to the subcarrier spacing. For example, when the subcarrier spacing is 15 kHz, 14 symbols may be included in one subframe. However, if the subcarrier spacing is doubled to 30 kHz, the duration of one symbol is halved so that a total of 28 symbols may be included in one subframe. The subcarrier spacing may be 15 kHz*2n and the number of symbols included in one subframe may be 14*2n. Herein, n is an integer such as 0, 1, 2 . . . , and is not always limited to a positive integer. For example, if n is −1, which is a negative integer, a total of 7 symbols may be included in one subframe.

[Non-Orthogonal Multiple Access]

A multi-access system may be divided into orthogonal multiple access (OMA) and non-orthogonal multiple access (NOMA) according to whether orthogonality is guaranteed. NOMA is a multi-access scheme in which data of multiple users is non-orthogonally transmitted on the same resource. For example, the NOMA system transmits data of multiple users through superposition on the same time-frequency resource, so that the NOMA system aims at acquiring transmission capacity gain or increasing the number of simultaneous accesses as compared with a legacy LTE system.

In the NR system, a new multi-access scheme is required for massive connectivity at a transmitter and a receiver. Another scheme other than OMA, which is a multi-access scheme used in the LTE system, is under consideration in NR. Typically, as will be described later, NOMA, which is a new scheme such as sparse code multiple access (SCMA) or multi-user superposition transmission (MUST), is under discussion for NR. The NOMA system may also be referred to as MUST in the 3GPP standardization work.

NOMA series technology, which is being considered as element technology of a next-generation 5G system, is divided into MUST for distinguishing between users based on a power level, SCMA using space complex codebook based modulation, and interleave division multiple access (IDMA) using a user-specific interleaver.

Figure 6:
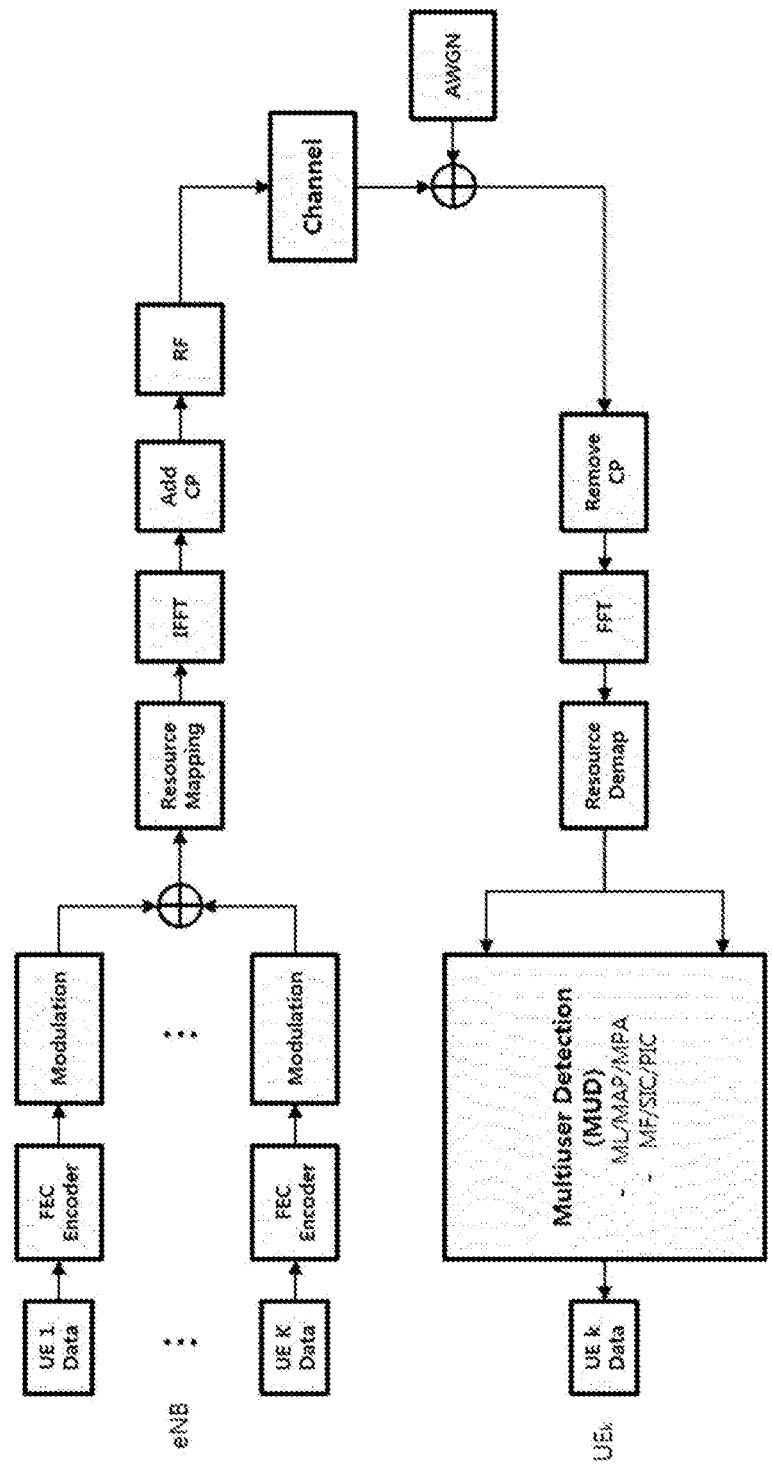
FIG. 6 is a block diagram illustrating a DL transmission and reception flow based on NOMA.

FIG. 6 is a block diagram illustrating a DL transmission and reception flow based on NOMA.

In a MUST system, a transmitter of FIG. 6 may differently allocate each user symbol after modulating multi-user data or hierarchically modulates the multi-user data based on hierarchical modulation. A receiver demodulates the multi-user data through multi-user detection (MUD).

In an SCMA system, the transmitter of FIG. 6 replaces a procedure of a forward error correction (FEC) encoder and a modulation procedure, for multi-user data, with a sparse complex codebook modulation scheme which is previously scheduled, and the receiver demodulates the multi-user data through MUD. SCMA may be understood as a NOMA scheme which is a combination of advantages of a CDMA scheme and an OFDMA scheme. According to the SCMA scheme, data streams to be transmitted are mapped to codewords of different codebooks.

In an IDMA system, the transmitter of FIG. 6 modulates EFC encoding information for multi-user data through a UE-specific interleaver. The receiver demodulates the multi-user data through MUD.

The receiver of each NOMA system may demodulate the multi-user data using various MUD schemes. For example, the MUD schemes may include maximum likelihood (ML), maximum joint a posteriori probability (MAP), message passing algorithm (MPS), matched filtering (MF), successive interference cancellation (SIC), parallel interference cancellation (PIC), and codeword interference cancellation (CWIC). There may be a difference in demodulation complexity and processing time delay according to each demodulation scheme or the number of attempts of repeated demodulation.

Figure 7:
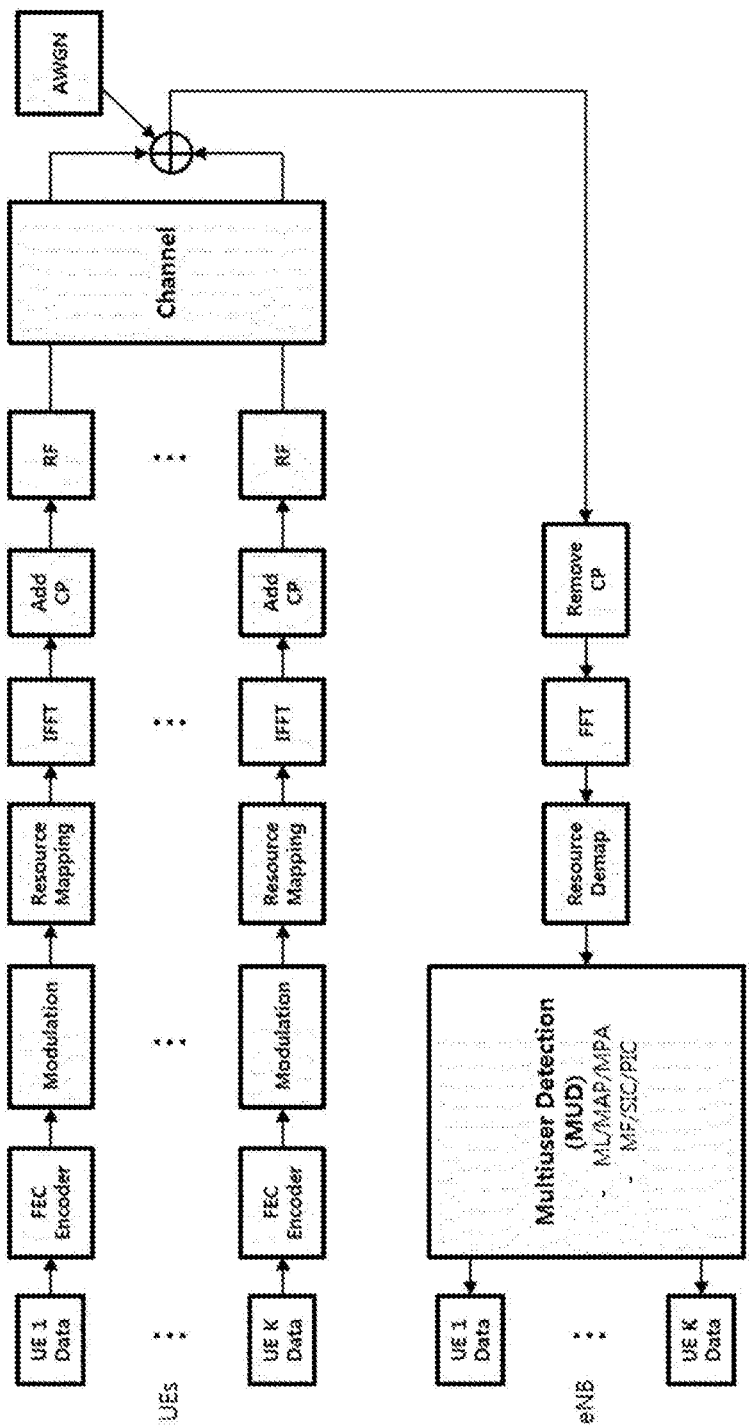
FIG. 7 is a block diagram illustrating a UL transmission and reception flow based on NOMA.

FIG. 7 is a block diagram illustrating a UL transmission and reception flow based on NOMA. A transmitter of each system may transmit multi-user data and a receiver of each system may demodulate the multi-user data at a receiver, in a manner similar to the description of the DL structure of FIG. 6.

[RS for Contention-Based Multiple Access and Mapping between Codewords]

In the NR system, contention-based transmission is being considered. Generally, it is inefficient to simultaneously support a great many UEs by a scheduling scheme. Particularly, when data of UEs is intermittently generated and there are small volumes of data, the scheduling scheme may be very inefficient.

Accordingly, contention-based transmission may be considered for more efficient transmission of UEs. In particular, contention-based transmission may be used to reduce UL latency.

For these reasons, in the NR system, a contention-based transmission scheme using NOMA may be used. This is because the NOMA scheme of contention-based transmission may simultaneously support access of more UEs relative to an OMA scheme of contention-based transmission. The NOMA scheme of the contention-based transmission may cause an increase in the transmission capacity of a network.

The term "codeword" or "codeword resource" used in the present disclosure will now be defined. In a legacy LTE system, the codeword has been defined as the unit of encoded bits which are generated through channel coding but the present invention is not limited thereto. For NOMA transmission of multi-user data on the same resource, a mechanism or user-specific data processing, capable of distinguishing between user data, is demanded and in this present disclosure, this is referred to as the codeword or the codeword resource. For example, according to the MUST scheme among the NOMA schemes, codeword 1 and codeword 2 may have different transmission power levels. According to the SCMA scheme among the NOMA schemes, codeword 1 and codeword 2 may have indexes of different sparse complex codebooks (i.e., different sparse codes). In other words, in the SCMA scheme, the codeword may mean an SCMA codeword which is SCMA-encoded through a sparse code. Therefore, when SCMA is used, codewords which will be described later may be referred to as SCMA codewords. According to the IDMA scheme among the NOMA schemes, codeword 1 and codeword 2 may have different interleaving schemes. In this way, NOMA processing of user data for MUD of the receiver by the transmitter may be defined as the codeword in a wide sense. Hereinafter, the terms "codeword" and "codeword resource" are interchangeably used. Strictly distinguishing between the codeword and the codeword resource, user data processed through the codeword resource (e.g., power, sparse code, or user-specific interleaver) may correspond to the codeword.

It is assumed in the present disclosure, while the user data is transmitted by a contention-based NOMA scheme, an RS is transmitted by the contention-based OMA scheme. This is because channel estimation can be more precisely performed when the RS is transmitted by the OMA scheme.

In the following description, collision may mean collision between RSs. Since the RSs are also transmitted based on contention, different UEs may transmit RSs of the same index on the same time-frequency resource and such a situation may be defined as RS collision. In terms of a receiver, there may be no problem in receiving the RSs but channel estimation for an individual UE cannot be performed. Meanwhile, when different UEs use the same codeword index and different RS indexes, this may not be considered to be collision. If there is no RS collision, the receiver may overcome codeword collision based on a channel which is correctly estimated by the receiver.

To correctly operate contention-based transmission using NOMA, a transmission and reception procedure including configurations of RSs of UEs contending with each other and codewords of NOMA is needed. Therefore, an adaptive mapping scheme between RSs and codewords in contention-based transmission scheme using NOMA will be proposed hereinbelow.

According to an embodiment of the present invention, a 1:1 mapping scheme, a 1:N mapping scheme, or an N:1 mapping scheme may be considered as a mapping scheme between RSs and codewords. The reason why the RSs and the codewords are mapped is to reduce blind detection complexity of the receiver.

First, a region of resources for contention-based data transmission (hereinafter, such resources are referred to as 'contention resources') may be defined. The contention resources may mean a plurality of time/frequency resources on which data of multiple users can be transmitted. The contention resources may also mean various resources including time, frequency, codewords, sequences, power scrambling, interleaver, and spatial resources. In contention-based data transmission, since a UE has not received a grant for data transmission, the UE needs to select and transmit a resource for data transmission from among the contention resources. For example, it is assumed that the above-described resources such as time and frequency in one contention resource region are shared by a plurality of UEs and a total of 12 codeword resources is usable in one contention resource region. In SCMA, it is assumed that one SCMA codebook supports a total of 12 SCMA codewords. Then, the UE may perform data transmission by randomly selecting one of the 12 codeword resources. The UE transmits data using a codeword which is different from a codeword used by another UE transmitting data on the same physical resource in the same contention resource region. Accordingly, the receiver may detect and decode data transmitted using each codeword.

Case 1: Maximum DMRS INDEX=Maximum Codeword INDEX

Case 1 is the case in which the total number of demodulation reference signal (DMRS) sequences is equal to the total number of contention resources (e.g., the total number of codewords). In this case, the DMRS sequences may be mapped to the contention resources in 1:1 correspondence. For example, the DMRS sequences and the contention resources may be mapped such that Codeword_INDEX= DMRS_INDEX. If the total number of codewords is 12, the total number of DMRS sequences is 12, and codeword 1 is selected according to a cell-radio network temporary identifier (C-RNTI), DMRS_INDEX 1 may be used.

In Case 1, if collision between the DMRS sequences does not occur, collision between codewords does not occur either. In addition, when the eNB decodes data transmitted by the UE through blind detection of a DMRS, the eNB may perform data decoding based on a codeword mapped to the detected DMRS without the need to perform blind detection of the codeword.

If DMRS sequences and contention resources have not been mapped, blind detection of a codeword for data decoding is additionally needed after blind detection of a DMRS.

In addition, collision between codewords may occur even when collision between DMRS sequences does not occur. In this case, even if channel estimation is normally performed, MUD performance at the receiver may not be guaranteed due to collision between codewords. Alternatively, collision between codewords may not occur even when collision between DMRS sequences occurs. In this case, MUD may be performed by using other codewords. However, since channel estimation is not normally performed, MUD performance is not guaranteed.

If the DMRS sequences and the contention resource have not been mapped, since a collision probability of the DMRSs is independent of a collision probability of the codewords, a total collision probability may increase. For example, if 12 DMRS sequences have been mapped to 12 contention resources in 1:1 correspondence, a probability that both collision between DMRSs and collision between codewords in contention-based transmission of two UEs do not occur is 11/12. Meanwhile, if 12 DMRS sequences and 12 contention resources have not been mapped, a probability that both collision between the DMRSs and collision between the codewords do not occur is 121/144.

Accordingly, only when both collision between the DMRSs and collision between the codewords do not occur, mapping between the DMRS sequences and the contention resources is favorable to raise detection performance and lower a collision probability in an environment in which MUD can be performed, that is, an environment in which decoding performance is not guaranteed Meanwhile, when at least one of collision between DMRSs and collision between codewords does not occur, mapping between the DMRS sequences and contention resources may not be assumed in an environment in which MUD can be performed, that is, an environment in which decoding performance is guaranteed (e.g., an environment in which MUD performance is guaranteed). For example, when 12 DMRS sequences have been mapped to 12 contention resources, a probability that both collision between DMRSs and collision between codewords in contention-based transmission of two UEs occur is 1/12. On the other hand, when 12 DMRS sequences have not been mapped to 12 contention resources, a probability that both collision between the DMRSs and collision between the codewords occur is 1/144.

Accordingly, in an environment in which MUD performance is guaranteed and blind detection complexity demanded by the receiver is capable of being sufficiently processed, the DMRS sequences and the contention resources are not mapped and a codeword index may be randomly selected.

Case 2: Maximum DMRS INDEX>Maximum Codeword INDEX

Case 2 is the case in which the total number of DMRSs is greater than the total number of contention resources (the total number of codewords in the above example). In this case, the DMRS sequences may be mapped to the contention resources in N:1 or 1:1 correspondence.

In the case of 1:1 mapping, all DMRS sequences may not always be used for 1:1 mapping of the DMRS sequences and the contention resources. For example, assuming that N=(Maximum DMRS_INDEX)/(Maximum Codeword_INDEX), selection of a codeword may be defined as Codeword_INDEX=mod(C-RNTI, Maximum Codeword_INDEX) and selection of a DMRS sequence may be defined as DMRS_INDEX=mod(C-RNTI, Maximum Codeword_INDEX)*N−1.

Herein, assuming that the indexes of the DMRS sequences are sequentially defined by a cyclic shift (CS), a DMRS sequence associated with a maximum codeword index may be selected to select a DMRS using a maximally separated CS value. As a specific example, it is assumed that the total number of codewords is 3 and the total number of DMRSs is 12. When a codeword selected according to the C-RNTI is 1, 2, or 3, DMRS INDEX of 3, 7, or 11 may be selected.

According to the 1:1 mapping scheme, if collision between DMRS sequences caused by multiple users does not occur, collision between codewords does not occur either. When the eNB has blind-detected a DMRS, the eNB may perform data decoding based on a codeword mapped to the DMRS without performing blind decoding of a codeword during decoding of data transmitted by the UE.

In the case of N:1 mapping, N DMRS sequences are mapped to one codeword. Then, selection of a codeword may be defined as Codeword_INDEX=mod(DMRS_INDEX, Maximum Codeword_INDEX). For example, it is assumed that the total number of codewords is 3 and the total number of DMRSs is 12. When DMRS_INDEX is 1, 4, 7, or 10, Codeword_INDEX of 1 may be selected. When DMRS_INDEX is 2, 5, 8, or 11, Codeword_INDEX of 2 may be selected. Even in this case, when the eNB decodes data of the UE after performing blind decoding of a DMRS, the eNB may perform data decoding based on a codeword mapped to the DMRS without performing blind detection of the codeword. If collision between DMRS sequences of multiple users does not occur even when collision between codewords occurs, the eNB may perform MUD based on a channel estimated through the DMRS. For example, if channel estimation performance is guaranteed, the eNB may perform MUD for user data by a combining technology through MIMO (e.g., maximum ratio combining (MRC)-interference rejection combining (IRC) or minimum mean square error (MMSE)-IRC) or an SIC scheme through a power difference.

If DMRS sequences and contention resources have not been mapped, blind detection of a codeword for data decoding is additionally needed after blind detection of a DMRS. In addition, collision between codewords may occur even when collision between DMRS sequences does not occur. Thus, if collision between codewords occurs, even when channel estimation is normally performed, MUD performance at the receiver may not be guaranteed due to collision between codewords. In contrast, collision between codewords may not occur even if collision between DMRS sequences occurs. In this case, MUD may be performed by using other codewords. However, since channel estimation is not normally performed, MUD performance is not guaranteed.

When the DMRS sequences and the contention resources have not been mapped, a total collision probability may increase because a collision probability of the DMRSs is independent of a collision probability of the codewords. For example, in the above example in which the DMRS sequences and the contention resources have been mapped, a probability that both collision between the DMRSs and collision between the codewords in contention-based transmission of two UEs do not occur is 2/3. Meanwhile, when the DMRS sequences and the contention resources have not been mapped, a probability that both collision between the DMRSs and collision between the codewords do not occur is 22/36. Accordingly, when at least one of collision between the DMRSs and collision between the codewords occurs, a mapping scheme between the DMRS sequences and the contention resources is favorable to raise reception performance and lower a collision probability in an environment in which MUD cannot be performed (i.e., an environment in which decoding performance is not guaranteed).

On the other hand, when at least one of collision between the DMRSs and collision between the codewords does not occur, mapping between the DMRS sequences and the contention resources may not be assumed in an environment in which MUD is capable of being performed (i.e., an environment in which decoding performance is guaranteed). For example, in the above example in which the DMRS sequences and the contention resources have been mapped, a probability that both collision between the DMRSs and collision between the codewords in contention-based transmission of two UEs occur is 1/3. On the other hand, when the DMRS sequences and the contention resources have not been mapped, a probability that both collision between the DMRSs and collision between the codewords occur is 1/36. Therefore, in an environment in which MUD performance is guaranteed and blind detection complexity of the receiver is not problematic, the DMRS sequences and the contention resources are not mapped and the codeword index may be randomly selected.

Case 3: Maximum DMRS INDEX<Maximum Codeword INDEX

Case 3 is the case in which the total number of DMRSs is less than the total number of contention resources (e.g., the total number of codewords). In this case, the DMRS sequences may be mapped to the contention resources in 1:M correspondence. For example, selection of the codeword may be defined as DMRS_INDEX=ceil(Codeword_INDEX/M). Herein, M=(Maximum Codeword_INDEX)/(Maximum DMRS_INDEX). For example, it is assumed that the total number of codewords is 12 and the total number of DMRSs is 4. If DMRS_INDEX is 1, Codeword_INDEX is 1, 2, or 3 and, if DMRS_INDEX is 2, Codeword_INDEX is 4, 5, or 6. In this case, there is a disadvantage in that collision between DMRSs may occur even when collision between codewords caused by multiple users does not occur. However, if there is no DMRS collision, when the eNB decodes data of the UE after blind-detecting a DMRS, the eNB may reduce the number of blind detection attempts of codewords to M based on the number of codewords that can be mapped to the detected DMRS.

If the DMRS sequences and the contention resources have not been mapped, blind detection of a codeword for data decoding is additionally needed after blind detection of a DMRS. In addition, collision between codewords may occur even when collision between DMRS sequences does not occur. In this case, even if channel estimation is normally performed, MUD performance at the receiver may not be guaranteed due to collision between codewords. Alternatively, collision between codewords may not occur even when collision between DMRS sequences occurs. In this case, MUD may be performed if collision between codewords has not occurred using other codewords. However, since channel estimation is not normally performed, MUD performance is not guaranteed.

When the DMRS sequences and the contention resources have not been mapped, since a collision probability of the DMRSs is independent of a collision probability of the codewords, a total collision probability may increase. For example, in the above example in which the DMRS sequences and the contention resources have been mapped, a probability that both collision between the DMRSs and collision between the codewords in contention-based transmission of two UEs do not occur is 2/3. Meanwhile, when the DMRS sequences and the contention resources have not been mapped, a probability that both collision between the DMRSs and collision between the codewords do not occur is 22/36. Accordingly, if at least one of collision between the DMRSs and collision between the codewords occurs, a mapping scheme between the DMRS sequences and the contention resources is favorable to improve reception performance and reduce a collision probability in an environment in which MUD cannot be performed (i.e., an environment in which decoding performance is not guaranteed).

Meanwhile, if at least one of collision between the DMRSs and collision between the codewords does not occur, mapping between the DMRS sequences and the contention resources may not be assumed in an environment in which MUD can be performed. For example, in the above example in which the DMRS sequences and the contention resources are mapped, a probability that both collision between the DMRSs and collision between the codewords in contention-based transmission of two UEs occur is 1/3. On the other hand, when both the DMRS sequences and the contention resources have not been mapped, a probability that both collision between the DMRSs and collision between the codewords occur is 1/36. Therefore, in an environment in which MUD performance is guaranteed and blind detection complexity of the receiver is not problematic, the DMRS sequences and the contention resources are not mapped and a codeword index may be randomly selected.

Adaptive Mapping According to Collision Level/Probability

As described above, a 1:1 or N:1 scheme may be considered as a mapping relationship between DMRSs and codewords. The 1:1 scheme may increase a collision probability but reduce reception complexity relative to the N:1 scheme. If DMRSs are code-division-multiplexed (CDMed) by a CS, the 1:1 scheme may increase the density of RSs without the need to share limited radio resources by N RSs and shorten the interval between RS resources, thereby raising channel estimation performance. Meanwhile, since the N:1 scheme is a scheme in which a plurality of DMRSs is mapped to one codeword, a collision probability of DMRSs can be reduced. In addition, even when there are users using the same codeword, if collision between DMRSs does not occur, there is an advantage that data can be distinguished through MUD.

According to an embodiment of the present invention, a mapping scheme between RSs and codewords may be adaptively changed based on a degree to which collision between RSs occurs. If an RS collision level is greater than a threshold, an N:1 mapping scheme may be used, and if the RS collision level is less than the threshold, a 1:1 mapping scheme may be used. The eNB may transmit an indication of the N:1 scheme/1:1 scheme to the UE through a physical-layer signal (e.g., common DCI) or a higher-layer signal (e.g., RRC signaling, SIB1, SIB2, or MIB). In this case, the eNB may configure the value of N for the UE. The RS collision threshold may be predefined or may be signaled by the eNB to the UE. The RS collision threshold may be differently configured according to N.

For example, it is assumed that the number of DMRSs is 12 and the number of codewords is 6. When fewer collisions occur, the eNB may configure 6 DMRS indexes among 12 DMRS indexes to be mapped to 6 codewords in 1:1 correspondence. Upon selecting the 6 DMRS indexes to be used, the eNB may select the DMRS indexes to be less affected by channel delay spread. For example, when the DMRSs are designed by a CS scheme, the eNB may use DMRS indexes 1, 3, 5, 7, 9, and 11.

Meanwhile, different UEs may configure the same DMRS index so that many collisions may occur. In this case, the eNB may configure DMRSs as 6 groups of {1,2}, {3,4}, {5,6}, {7,8}, {9,10}, and {11,12}. Therefore, a collision probability may be halved relative to the 1:1 scheme. For example, even when UEs use the same codeword, collision between DMRSs may be avoided by selecting different DMRS indexes 1 and 2.

For example, in the N:1 scheme, N may be changed according to configuration. For example, it is assumed that the total number of DMRS indexes is 24 and the number of codewords is 6. When N=4, a collision probability of DMRSs may be minimized but the number of DMRS blind detection attempts may be relatively large. When N=2, the number of DMRS blind detection attempts is reduced and DMRS performance may be expected. However, a collision probability of DMRSs relatively increases.

The eNB may discern an RS collision level through signals received in a UL contention resource region. The RS collision level may mean how many RS collisions occur during a predetermined time, i.e., the frequency of RS collisions. The eNB may determine N of the N:1 scheme based on an RS collision level and an RS collision threshold and inform the UE of the determined N. Upon receiving N, the UE transmits data according to a corresponding mapping scheme.

(1) Receiver

Figure 8:
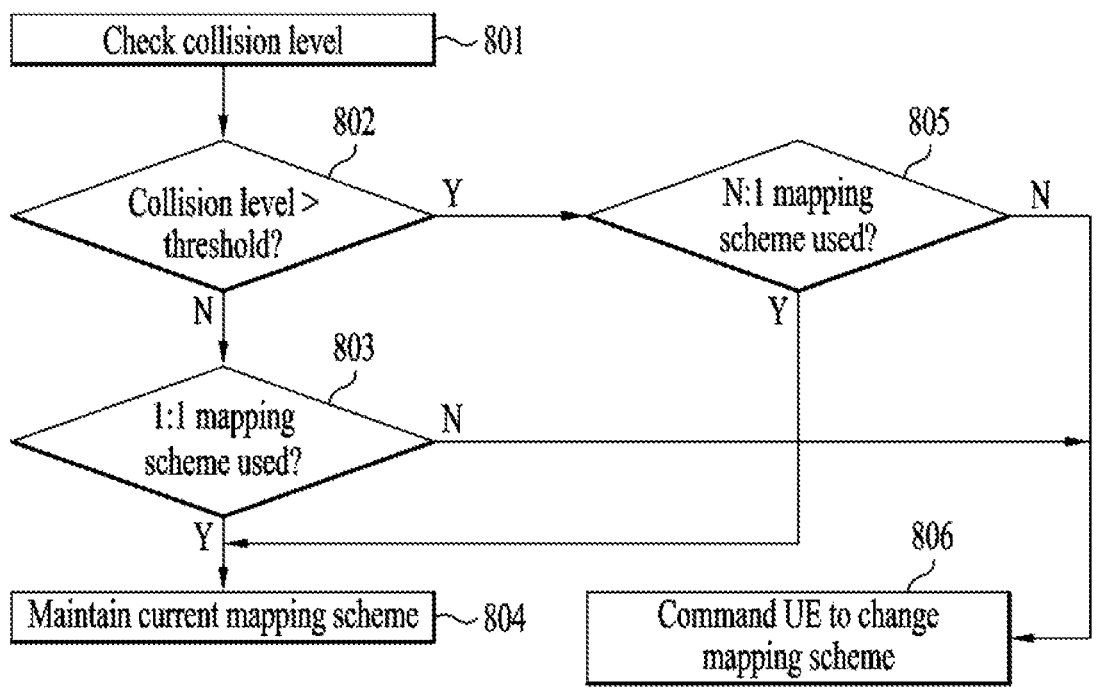
FIG. 8 illustrates an example of changing a mapping scheme by an eNB according to RS collision.

FIG. 8 illustrates an example of changing a mapping scheme by an eNB according to RS collision.

Referring to FIG. 8, the eNB checks an RS collision level while monitoring and blind-detecting a contention-based transmission resource region (801). The RS collision level may be statistically measured by time average.

The eNB compares the RS collision level with a predetermined threshold (802).

If the RS collision level is greater than the threshold, the eNB configures a mapping scheme as an N:1 mapping scheme. If a current scheme configured for the UE is a 1:1 scheme, the eNB commands the UE to change the mapping scheme (806) by indicating toggling information (e.g., in the case of 2 states of 1:1 scheme/N:1 scheme) indicating that the mapping scheme should be changed from the 1:1 scheme to the N:1 scheme or indicating N of N:1.

If the RS collision level is less than the threshold, the eNB checks whether the 1:1 scheme is being used (803). If the 1:1 scheme is not currently used, the eNB commands the UE to change the mapping scheme (806).

For example, it is assumed that the eNB is configured as the 1:1 mapping scheme, DMRS indexes are 1 to 12, and codeword indexes are 1 to 6. It is also assumed that DMRS indexes are mapped to codeword indexes in 1:1 correspondence, such that {DMRS index, codeword index}={1,1}, {3,2}, {5,3}, {7,4}, {9,5}, {11,6}. The eNB performs blind detection for DMRS indexes 1, 3, 5, 7, 9, and 11 in a contention-based transmission resource region. The eNB attempts to perform data detection using codeword indexes 2 and 4 when DMRS indexes 3 and 7 are detected.

Meanwhile, it is assumed that N=2 in the N:1 scheme, i.e., a 2:1 scheme, is mapped. It is also assumed that DMRS indexes are mapped to codewords indexes in 2:1 correspondence, such that {DMRS index, codeword index}={{1,2}, 1}, {{3,4},2}, {{5,6},3}, {{7,8},4}, {{9,10},5}, {{11,12}, 6}. The eNB performs blind detection for all DMRSs from 1 to 12. If DMRS indexes 1 and 2 are detected, the eNB detects two data based on codeword index 1. Since channels of respective UEs differ and multiple access signatures (e.g., scrambling sequences) differ, the eNB may distinguish between UEs through MUD.

(2) Transmitter

Figure 9:
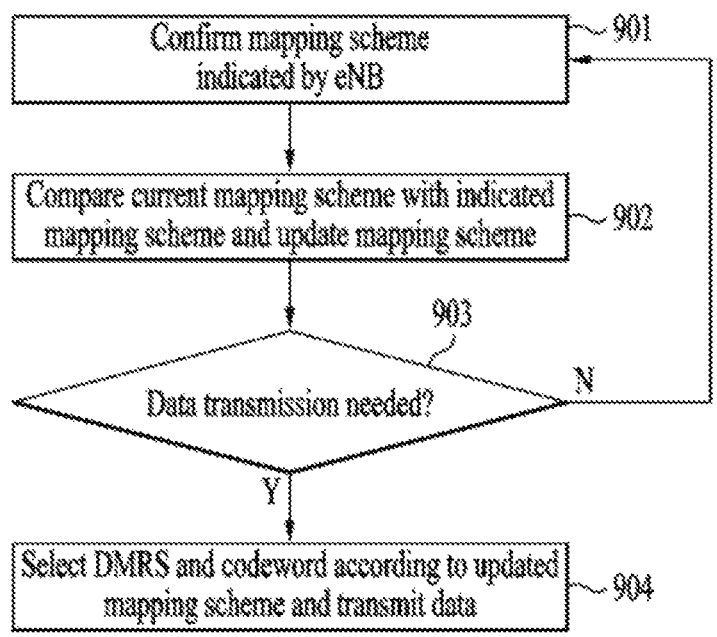
FIG. 9 illustrates a procedure of updating a mapping scheme and transmitting a signal by a UE.

FIG. 9 illustrates a procedure of updating a mapping scheme and transmitting a signal by a UE.

The UE monitors 1:1 N:1 mapping indication information signaled by the eNB (e.g., through a physical-layer signal or RRC signaling). The UE confirms the mapping indication information (901). If an indicated mapping scheme differs from a current mapping scheme configured for the UE, the UE updates the current mapping scheme to the indicated mapping scheme (902). If there is data to be transmitted, the UE transmits the data according to the updated mapping scheme (903 and 904).

For example, it is assumed that DMRS indexes are mapped to codeword indexes in 1:1 correspondence, such that {DMRS index, codeword index}={1,1}, {3,2}, {5,3}, {7,4}, {9,5},{11,6}. The UE may randomly select a DMRS index from among 1, 3, 5, 7, 9, and 11 or select the DMRS index based on an identifier (e.g., C-RNTI). If the UE selects DMRS index 11, data is spread (e.g., SCMA) with codeword index 6.

In addition, it is assumed that DMRS indexes and codeword indexes are mapped in 2:1 correspondence, such that {DMRS index, codeword index}={{1,2},1}, {{3,4},2}, {{5,6},3}, {{7,8},4}, {{9,10},5}, {{11,12},6}. When the UE selects both DMRS index 5 and DMRS index 6, data is equally spread with codeword index 3.

In the above examples, it has been assumed that N is 2. However, the present invention is equally applicable to the case in which N has values other than 2.

Figure 10:
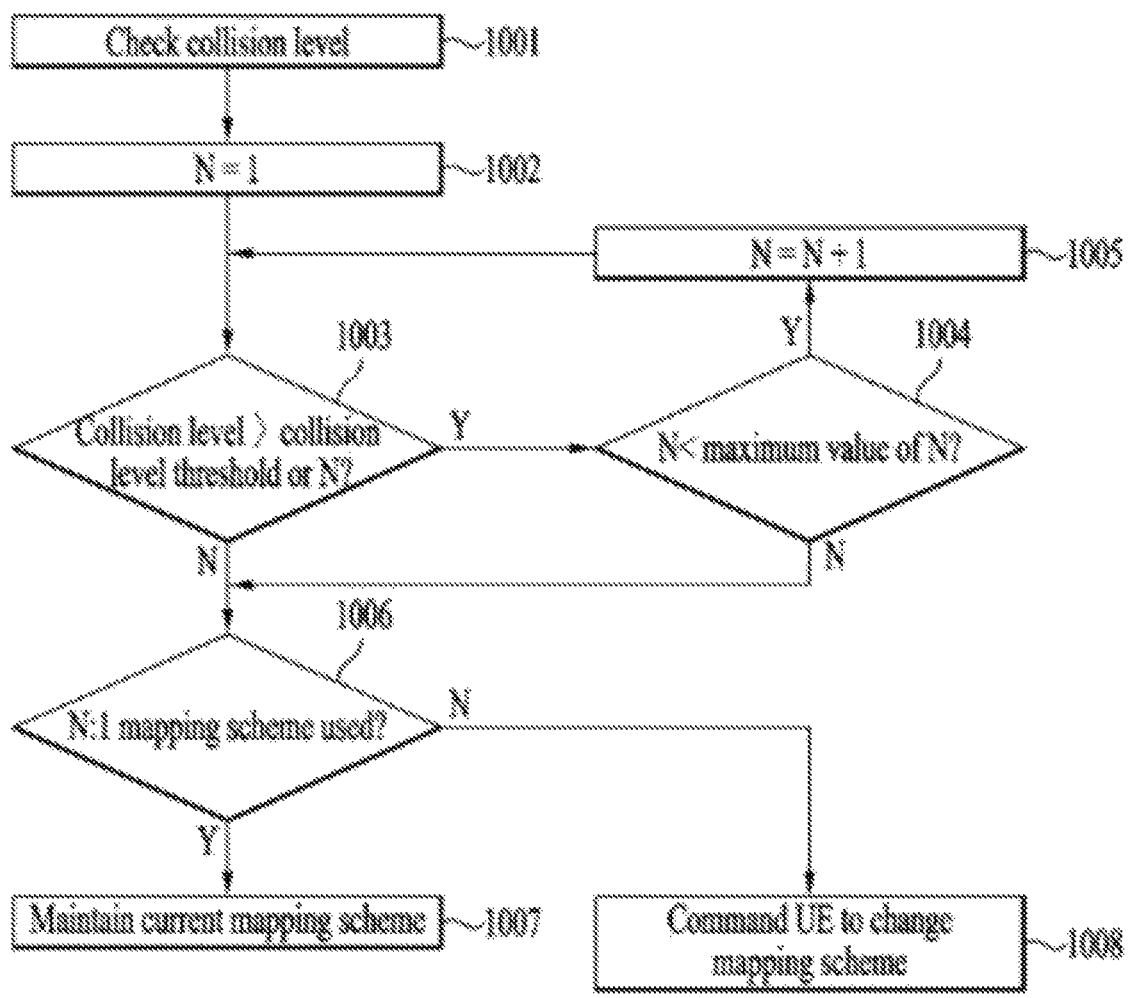
FIG. 10 illustrates an embodiment of using a different collision level threshold according to a mapping scheme.

FIG. 10 illustrates an embodiment of using a different collision level threshold according to a mapping scheme. For example, the collision level threshold may be differently configured according to the value of N.

Referring to FIG. 10, the eNB checks an RS collision level on a contention resource (1001).

The eNB initializes the value of N to 1 (1002).

The eNB compares a current collision level threshold for N=1 with the RS collision level (1003).

If the RS collision level is greater than the collision level threshold, the eNB determines whether a current N value is a maximum value of usable N (1004).

If the current N value is not the maximum value of usable N, the eNB increases the N value by one (1005). The eNB compares the current collision level threshold for N=2 with the RS collision level (1003).

In this way, the eNB searches for the value of N suitable for the current RS collision level by repeating steps 1003 to 1005.

If the value of N is determined, the eNB checks whether an N:1 mapping scheme is being used (1006). If the N:1 mapping scheme is not used, the eNB commands the UE to change a mapping scheme to the N:1 mapping scheme (1008).

Meanwhile, the number of DMRS indexes may not be a multiple of the number of codewords. For example, the number of DMRS indexes may be 12 and the number of codewords may be 8. Accordingly, a general equation for mapping DMRS indexes and codewords is proposed.

For example, it is assumed that the number of DMRS indexes is N_DMRS and the number of codewords is N_CODE. In this case, the value of N may be represented as N=floor(N_DMRS/N_CODE). As a specific example, if N_DMRS=16 and N_CODE=3, then N=5. Table 1 shows an example of 5:1 mapping.

TABLE 1

| Group ID | DMRS Index | Codeword |
|---|---|---|
| 1 | 1, 2, 3, 4, 5 | 1 |
| 2 | 6, 7, 8, 9, 10 | 2 |
| 3 | 11, 12, 13, 14, 15 | 3 |

In addition, when N_DMRS=16 and N_CODE=5, then N=3. Table 2 shows an example of 3:1 mapping.

TABLE 2

| Group ID | DMRS Index | Codeword |
|---|---|---|
| 1 | 1, 2, 3 | 1 |
| 2 | 6, 7, 8, | 2 |
| 3 | 11, 12, 13 | 3 |
| 4 | 4, 5, 9 | 4 |
| 5 | 14, 15, 16 | 5 |

According to Table 1 and Table 2, all DMRSs are not always used. For example, DMRS 16 is not mapped to a codeword in Table 1 and DMRS 10 is not mapped to a codeword in Table 2.

Unlike the examples of Table 1 and Table 2, a scheme in which N is determined to be N=floor(N_DMRS/N_CODE) and then all DMRSs are mapped to codewords may be considered. For example, a mapping scheme of codeword index=modulo(DMRS index, N) may be considered.

Table 3 shows a result of mapping DMRSs to codewords based on codeword index=modulo(DMRS index, N) when N_DMRS=16, N_CODE=5, and N=3.

TABLE 3

| Group ID | DMRS Index | Codeword |
|---|---|---|
| 1 | 1, 6, 11, 16 | 1 |
| 2 | 2, 7, 12 | 2 |
| 3 | 3, 8, 13 | 3 |
| 4 | 4, 9, 14 | 4 |
| 5 | 5, 10, 15 | 5 |

Referring to Table 3, DMRS indexes are mapped to each of codewords 2 to 5 in 3:1 correspondence and DMRS indexes are mapped to codeword 1 in 4:1 correspondence.

Meanwhile, the UE may perform time random backoff prior to contention-based transmission, so that collision may be reduced.

As another example of the present invention, the eNB may change a mapping scheme between DMRSs and codewords by further considering the number of RRC-connected UEs. Alternatively, instead of the collision level, the number of RRC-connected UEs may be used. For example, if the number of RRC-connected UEs increases, the eNB may increase the value of N under the assumption that the collision level is high.

As another example, the eNB may change the mapping scheme between DMRSs and codewords in consideration of the number of UEs capable of performing contention-based transmission rather than the number of RRC-connected UEs. For example, if only some UEs among the RRC-connected UEs can perform contention-based transmission, the eNB may consider only the number of UEs capable of performing contention-based transmission rather than all RRC-connected UEs.

In addition, during initial access, the eNB may distinguish between UEs which are capable of performing contention-based transmission and UEs which are not capable of performing contention-based transmission. The eNB may calculate a collision probability based on the number of UEs which are capable of performing contention-based transmission and may configure N.

Figure 11:
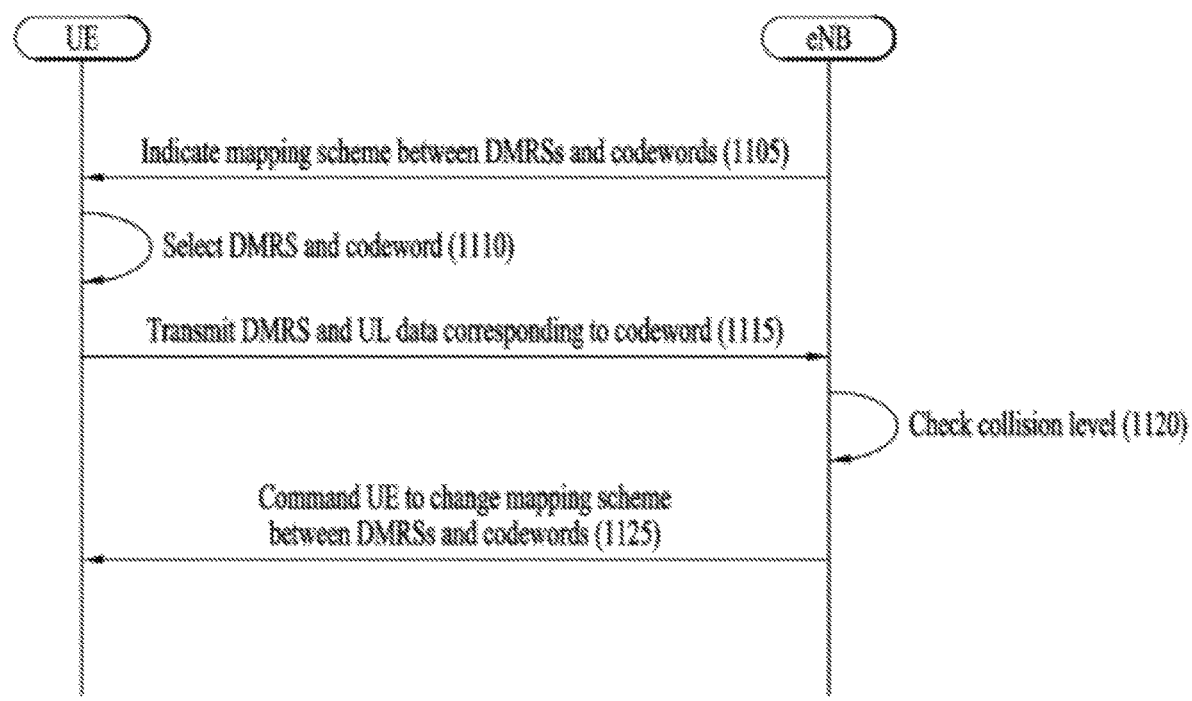
FIG. 11 illustrates an example of a method of performing contention-based UL transmission and reception.

FIG. 11 illustrates an example of a method of performing contention-based UL transmission and reception. A repetitive description compared with the contents of the above description may be omitted.

Referring to FIG. 11, an eNB indicates a mapping scheme between DMRSs and codewords (1105). For example, the UE may receive information indicating that one codeword is mapped to 'K' DMRSs from the eNB.

The UE selects a DMRS and a codeword in consideration of the indicated mapping scheme between the DMRSs and the codewords (1110). For example, the UE may select any one of plural codewords and any one of plural demodulation reference signals (DMRSs), configured in a contention resource region for contention-based UL transmission. The selected DMRS may be one of 'K' DMRSs mapped to the selected codeword. 'K' may be an integer equal to or greater than 1, which is changed according to DMRS collision occurring in the contention resource region. The number of the codewords configured in the contention resource region may be set to be smaller than the number of the DMRSs configured in the contention resource region.

The UE transmits the selected DMRS and UL data corresponding to the selected codeword through the contention resource region (1115). For example, the DMRS may be transmitted by an orthogonal multiple access (OMA) scheme and the UL data may be transmitted by a non-orthogonal multiple access (NOMA) scheme. The eNB may detect a DMRS of a corresponding UE through blind detection in the contention resource region for contention-based UL transmission. The eNB may detect the codeword of the UE from the plural codewords in the contention resource region, using the detected DMRS. The eNB may decode UL data corresponding to the detected codeword. The NOMA scheme may be sparse code multiple access (SCMA). The plural codewords may be SCMA codewords.

The eNB checks a DMRS contention level on the contention resource region (1120). DMRS collision may indicate that different UEs transmit the same DMRS on the same time-frequency resource. If the number of DMRS collisions per unit time increases, 'K' may also increase.

If the value of 'K' is changed, the eNB may command the UE to change the mapping scheme between DMRSs and codewords (1125).

'K' may be determined by 'floor(N_DMRS/N_CODE)', 'N_DMRS' may be the number of the DMRSs, 'N_CODE' may be the number of the codewords, 'floor' may be a floor function outputting a maximum integer not exceeding an input value.

Mapping between the codewords and the DMRSs may be determined by '$\alpha$=MOD($\beta$, K)', '$\alpha$' may be a codeword index, '$\beta$' may be a DMRS index, and 'MOD' may be a modulo operation.

Figure 12:
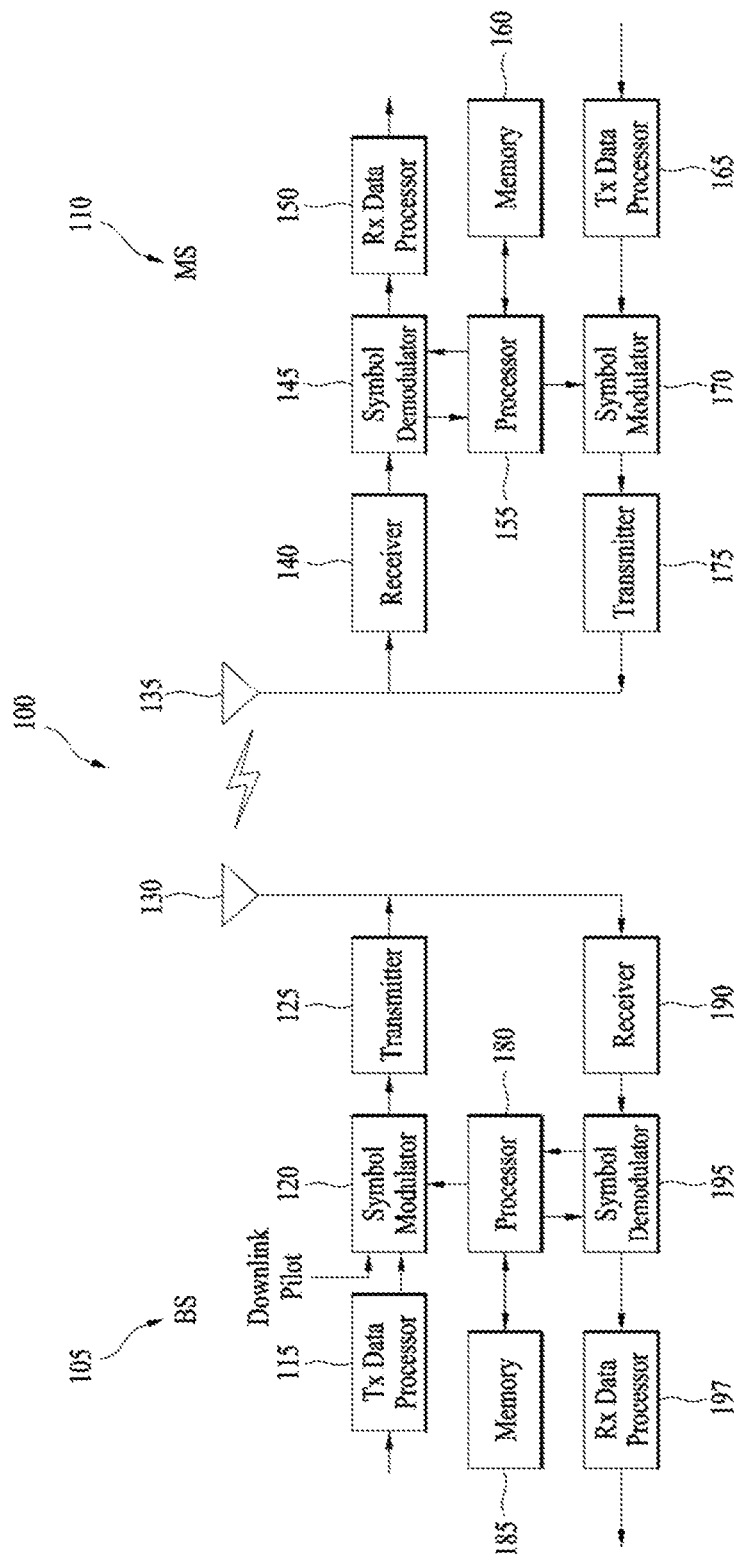
FIG. 12 illustrates a user equipment and an eNB according to an embodiment of the present invention.

FIG. 12 is a block diagram for configurations of an eNB 105 and a user equipment 110 in a wireless communication system 100.

Although one eNB 105 and one user equipment 110 are shown in the drawing to schematically represent a wireless communication system 100, the wireless communication system 100 may include at least one eNB and/or at least one user equipment.

Referring to FIG. 12, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present invention supports an MIMO (multiple input multiple output) system. And, the eNB 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

The invention claimed is:

1. A method of performing contention-based uplink (UL) transmission by a user equipment (UE) in a wireless communication system, the method comprising:
selecting any one of a plurality of codewords and any one of a plurality of demodulation reference signals (DMRSs), configured in a contention resource region for contention-based UL transmission; and
transmitting the selected DMRS and UL data corresponding to the selected codeword through the contention resource region,
wherein the DMRS is transmitted based on an orthogonal multiple access (OMA) scheme and the UL data is transmitted based on a non-orthogonal multiple access (NOMA) scheme, and
the selected DMRS is one of 'K' DMRSs mapped to the selected codeword, 'K' being an integer equal to or greater than 1, which is changed based on a DMRS collision occurring in the contention resource region.

2. The method of claim 1, wherein the DMRS collision indicates transmission of the same DMRS on the same time-frequency resource by different UEs and, as the number of DMRS collisions per unit time increases, 'K' also increases.

3. The method of claim 1, wherein the number of the codewords in the contention resource region is set to be smaller than the number of the DMRSs.

4. The method of claim 1, further comprising receiving information indicating that one codeword is mapped to the 'K' DMRSs.

5. The method of claim 1, wherein 'K' is determined based on a first equation 'floor(N_DMRS/N_CODE)', 'N_DMRS' is the number of the DMRSs, 'N_CODE' is the number of the codewords, and 'floor' is a floor function outputting a maximum integer not exceeding an input value.

6. The method of claim 5, wherein mapping between the codewords and the DMRSs is determined by a second equation 'α=MOD(β, K)', 'α' is a codeword index, 'β' is a DMRS index, and 'MOD' is a modulo operation.

7. The method of claim 1, wherein the NOMA scheme is sparse code multiple access (SCMA) and the codewords are SCMA codewords.

8. A method of receiving a contention-based uplink (UL) transmission signal by a base station (B S) in a wireless communication system, the method comprising:
- detecting a demodulation reference signal (DMRS) of a user equipment (UE) among a plurality of DMRSs through blind detection in a contention resource region for contention-based UL transmission;
- detecting a codeword of the UE among a plurality of codewords in the contention resource region using the detected DMRS; and
- decoding UL data corresponding to the decoded codeword,
- wherein the DMRS is received based on an orthogonal multiple access (OMA) scheme and the UL data is received based on a non-orthogonal multiple access (NOMA) scheme,
- the detected DMRS is one of 'K' DMRSs mapped to the detected codeword, 'K' being an integer equal to or greater than 1, which is changed based on a DMRS collision occurring in the contention resource region.

9. The method of claim 8, wherein the DMRS collision indicates transmission of the same DMRS on the same time-frequency resource by different UEs and, as the number of DMRS collisions per unit time increases, 'K' also increases.

10. The method of claim 8, wherein the number of the codewords in the contention resource region is set to be smaller than the number of the DMRSs.

11. The method of claim 8, further comprising transmitting information indicating that one codeword is mapped to the 'K' DMRSs.

12. The method of claim 8, wherein 'K' is determined by a first equation 'floor(N_DMRS/N_CODE)', 'N_DMRS' is the number of the DMRSs, 'N_CODE' is the number of the codewords, and 'floor' is a floor function outputting a maximum integer not exceeding an input value.

13. The method of claim 12, wherein mapping between the codewords and the DMRSs is determined by a second equation '$\alpha$=MOD($\beta$, K)', '$\alpha$' is a codeword index, '$\beta$' is a DMRS index, and 'MOD' is a modulo operation.

14. The method of claim 8, wherein the NOMA scheme is sparse code multiple access (SCMA) and the codewords are SCMA codewords.

15. A user equipment (UE) for performing contention-based uplink (UL) transmission in a wireless communication system, the UE comprising:
- a processor configured to select any one of a plurality of codewords and any one of a plurality of demodulation reference signals (DMRSs), configured in a contention resource region for contention-based UL transmission; and
- a transmitter configured to transmit the selected DMRS and UL data corresponding to the selected codeword through the contention resource region, based on control of the processor,
- wherein the DMRS is transmitted based on an orthogonal multiple access (OMA) scheme and the UL data is transmitted based on a non-orthogonal multiple access (NOMA) scheme, and
- the selected DMRS is one of 'K' DMRSs mapped to the selected codeword, 'K' being an integer equal to or greater than 1, which is changed based on a DMRS collision occurring in the contention resource region.

* * * * *